(12) United States Patent
Read et al.

(10) Patent No.: US 11,965,430 B1
(45) Date of Patent: Apr. 23, 2024

(54) FLARED MANDREL AND PROCESS FOR EFFECTIVE USE IN TRANSITION REGIONS

(71) Applicant: RTX Corporation, Farmington, CT (US)

(72) Inventors: Kathryn S. Read, Marlborough, CT (US); David J. Wasserman, Hamden, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/244,563

(22) Filed: Sep. 11, 2023

(51) Int. Cl.
*F01D 5/28* (2006.01)

(52) U.S. Cl.
CPC .......... *F01D 5/282* (2013.01); *F05D 2300/10* (2013.01); *F05D 2300/224* (2013.01); *F05D 2300/6033* (2013.01)

(58) Field of Classification Search
CPC ....................................................... F01D 5/282
See application file for complete search history.

(56) References Cited

U.S. PATENT DOCUMENTS

| | | | |
|---|---|---|---|
| 7,479,302 B2 | 1/2009 | Steffier | |
| 9,427,834 B2 | 8/2016 | Fremont et al. | |
| 10,202,860 B2 | 2/2019 | Hillier | |
| 10,370,988 B2 | 8/2019 | Hillier | |
| 10,457,020 B2 | 10/2019 | Weaver et al. | |
| 11,384,646 B2 | 7/2022 | Kittleson et al. | |
| 11,400,624 B2 | 8/2022 | Blaney et al. | |
| 11,530,614 B2 | 12/2022 | Burdette et al. | |
| 2003/0175453 A1* | 9/2003 | Steffier | F28D 7/0041 428/34.5 |
| 2019/0390555 A1 | 12/2019 | Kline et al. | |

FOREIGN PATENT DOCUMENTS

| | | | |
|---|---|---|---|
| CA | 2612014 A1 | 5/2008 | |
| GB | 2606342 A | 11/2022 | |
| WO | WO-2007092305 A2 * | 8/2007 | B29C 43/027 |

* cited by examiner

*Primary Examiner* — Jason L Vaughan
*Assistant Examiner* — Amanda Kreiling
(74) *Attorney, Agent, or Firm* — Kinney & Lange, P.A.

(57) ABSTRACT

A method of forming a vane preform includes braiding a sleeve from ceramic fibers, inserting a flared mandrel into the sleeve, the flared mandrel comprising a body region and at least one contoured region, manipulating the sleeve using the flared mandrel to form contours in the sleeve corresponding to the contoured region of the flared mandrel, and laying up at least one ceramic ply with the sleeve to form the vane preform.

18 Claims, 6 Drawing Sheets

FLARED MANDREL AND PROCESS FOR EFFECTIVE USE IN TRANSITION REGIONS

BACKGROUND

The present invention relates to ceramic matrix composites (CMCs) and, more particularly, to the manufacturing of CMC vanes.

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. CMC materials are also being considered for airfoils. Among other attractive properties, CMCs have high temperature resistance. Despite this attribute, however, there are unique challenges to implementing CMCs in airfoils.

SUMMARY

A method of forming a vane preform includes braiding a sleeve from ceramic fibers, inserting a flared mandrel into the sleeve, the flared mandrel comprising a body region and at least one contoured region, manipulating the sleeve using the flared mandrel to form contours in the sleeve corresponding to the contoured region of the flared mandrel, and laying up at least one ceramic ply with the sleeve to form the vane preform.

A multi-piece flared mandrel suitable for shaping a portion of a vane preform includes a first mandrel portion comprising a first body region and a first contoured region, and a second mandrel portion comprising a second body region and a second contoured region.

Figure 1:
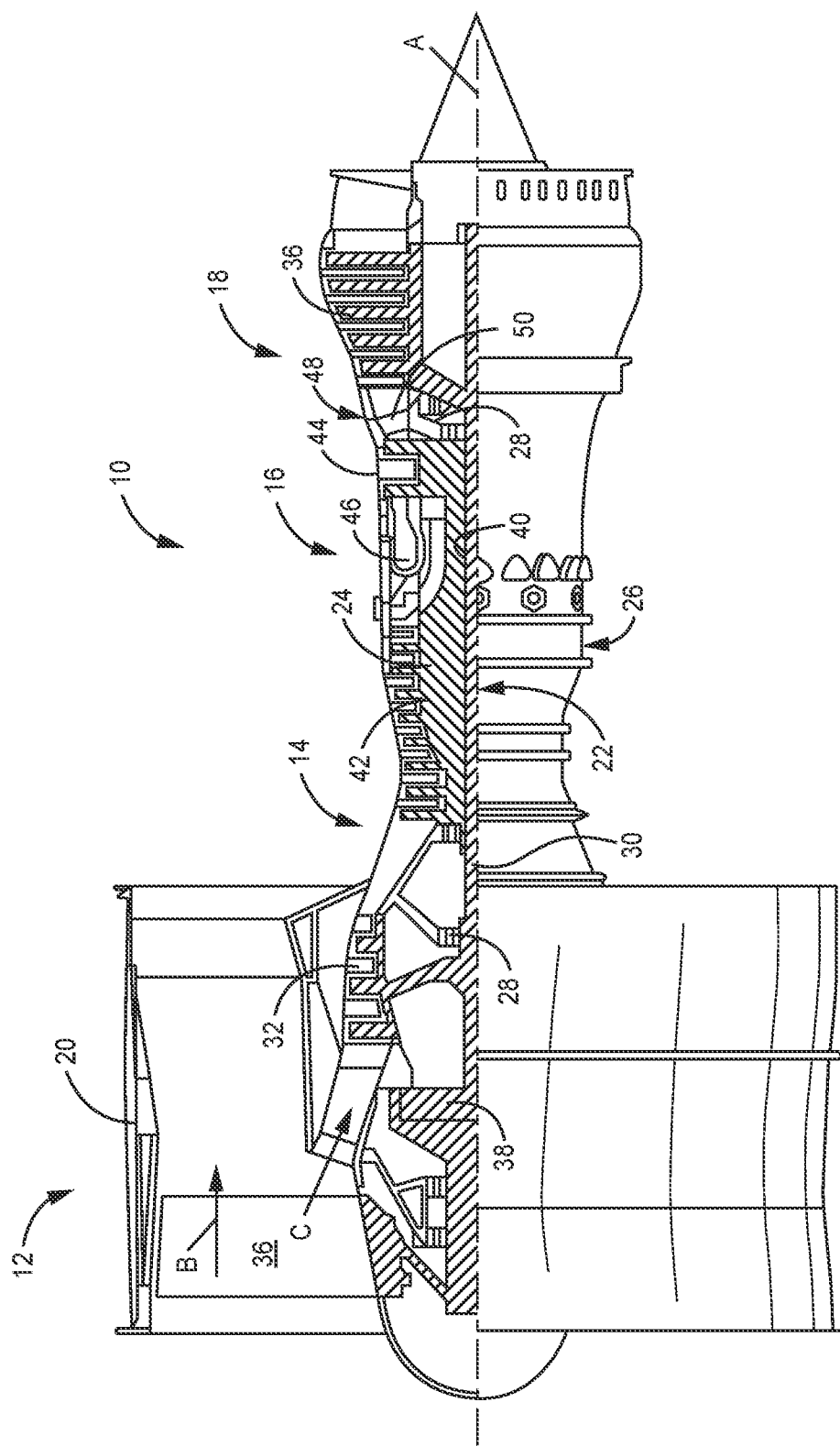
FIG. 1 is a simplified quarter-sectional view of an exemplary embodiment of a gas turbine engine.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

FIG. 1 schematically illustrates gas turbine engine 10. Gas turbine engine 10 is disclosed herein as a two-spool turbofan that generally incorporates fan section 12, a compressor section 14, combustor section 16, and turbine section 18. Fan section 12 drives air along bypass flow path B in a bypass duct defined within housing 20, such as a fan case or nacelle, and also drives air along core flow path C for compression and communication into combustor section 16 then expansion through turbine section 18. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 10 generally includes low speed spool 22 and high speed spool 24 mounted for rotation about an engine central longitudinal axis A relative to engine static structure 26 via several bearing systems 28. It should be understood that various bearing systems 28 at various locations may alternatively or additionally be provided, and the location of bearing systems 28 may be varied as appropriate to the application.

Low speed spool 22 generally includes inner shaft 30 that interconnects, a first (or low) pressure compressor 32 and a first (or low) pressure turbine 34. Inner shaft 30 is connected to fan 36 through a speed change mechanism, which in exemplary gas turbine engine 10 is illustrated as geared architecture (i.e., fan drive gear system) 38 to drive fan 36 at a lower speed than low speed spool 22. High speed spool 24 includes outer shaft 40 that interconnects a second (or high) pressure compressor 42 and a second (or high) pressure turbine 44. Combustor 46 is arranged in the exemplary gas turbine 10 between high pressure compressor 42 and high pressure turbine 44. Mid-turbine frame 48 of engine static structure 26 may be arranged generally between high pressure turbine 44 and low pressure turbine 34. Mid-turbine frame 48 further supports bearing systems 28 in the turbine section 18. Inner shaft 30 and outer shaft 40 are concentric and rotate via bearing systems 28 about the engine central longitudinal axis A which is collinear with their longitudinal axes.

The core airflow is compressed by low pressure compressor 32 then high pressure compressor 42, mixed and burned with fuel in the combustor 46, then expanded through high pressure turbine 44 and low pressure turbine 34. Mid-turbine frame 48 includes airfoils 50 which are in core airflow path C. Turbines 34, 44 rotationally drive the respective low speed spool 22 and high speed spool 24 in response to the expansion. It will be appreciated that each of the positions of the fan section 12, compressor section 14, combustor section 16, turbine section 18, and geared architecture 38 may be varied. For example, geared architecture 38 may be located aft of low pressure compressor 32, aft of combustor section 16, or even aft of turbine section 18, and fan 36 may be positioned forward or aft of the location of fan drive gear system 38.

Engine 10 in one example is a high bypass geared aircraft engine. In a further example, the engine bypass ration is greater than about six (6), with an example embodiment being greater than about ten (10), and can be less than or equal to about 18.0, or more narrowly can be less than or equal to 16.0. The geared architecture 38 is an epicyclic gear train, such as a planetary gear system or other gear system, with a gear reduction ratio of greater than about 2.3. The gear reduction ratio may be less than or equal to 4.0. Low pressure turbine 34 has a pressure ratio that is greater than about five. The low pressure turbine pressure ratio can be less than or equal to 13.0, or more narrowly less than or equal to 12.0. In one disclosed embodiment, engine bypass ratio is greater than about ten (10:1), the diameter of fan 36 is significantly larger than that of low pressure compressor 32, and low pressure turbine 34 has a pressure ratio that is greater than about five 5:1. The low pressure turbine pressure ratio is pressure measured prior to an inlet of low pressure turbine 34 as related to the pressure at the outlet of low pressure turbine 34 prior to an exhaust nozzle. Geared architecture 38 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by bypass flow B due to the high bypass ratio. Fan section 12 of engine 10 is designed for a particular flight condition, typically cruise at about 0.8 Mach and about 35,000 feet (10,668 meters). The flight condition of 0.8 Mach and 35,000 ft (10,668 meters), with engine 10 at its best fuel consumption—also known as "bucket cruise Thrust Specific Fuel Consumption ('TSFC')"—is the industry standard parameter of lbm of fuel being burned divided by lbf of thrust engine 10 produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
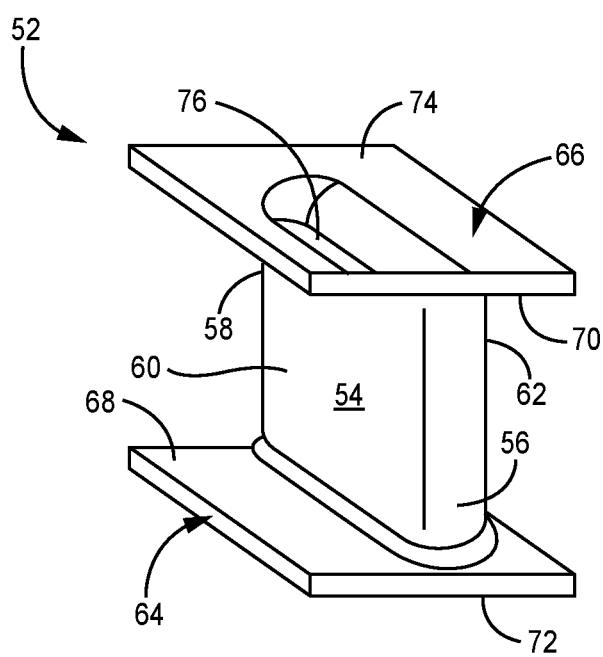
FIG. 2 is a simplified perspective view of a CMC vane belonging to the gas turbine engine of FIG. 1.

FIG. 2 is a perspective view of vane 52 belonging to engine 10. Vane 52 includes airfoil 54 having leading edge 56, trailing edge 58, pressure side 60, and suction side 62. Trailing edge 58 is oppositely disposed from leading edge 56, and suction side 62 is oppositely disposed from pressure side 60. Vane 52 further includes inner diameter (ID) platform 64 and oppositely disposed outer diameter (OD) platform 66. With respect to engine 10, the relative terms "inner diameter" and "outer diameter" refer to the proximity to longitudinal axis A of engine 10, with the outer diameter being radially further from axis A than the inner diameter. Airfoil 54 is connected to and extends between ID platform 64 and OD platform 66. ID platform 64 and OD platform 66 each include respective gas path surfaces 68 and 70, and respective non gas path surfaces 72 and 74. At least one inner cavity 76 within airfoil 54 extends between ID platform 64 and OD platform 66.

Vane 52 can be fabricated from ceramic fibers arranged in one of various two or three-dimensional woven architectures such as plain, harness (e.g., 3, 5, 8, etc.), twill, braid, or non-symmetric, or from non-woven (e.g., chopped, felted, etc.) fibers. The fibers can be reinforced with a ceramic matrix. The fibers and/or matrix can be formed from silicon carbide (SiC) or silicon nitride ($Si_3N_4$). One or more interface coatings (e.g., of boron nitride) can be applied prior to densification with the matrix. Vane 52 can be least partially formed by a braiding process. In particular, inner cavity 76 can be formed by braiding ceramic fibers around a mandrel to form the braided sleeve (shown and labeled in FIG. 4) that will define inner cavity 76 in the final component. Conventionally, a darting technique might be used to join strips of the braided sleeve to the platform plies. However, the darted material can be difficult to fold, making the desired contouring between inner cavity 76 and ID and/or OD platforms 64 and 66, respectively, difficult to achieve.

Figure 3A:
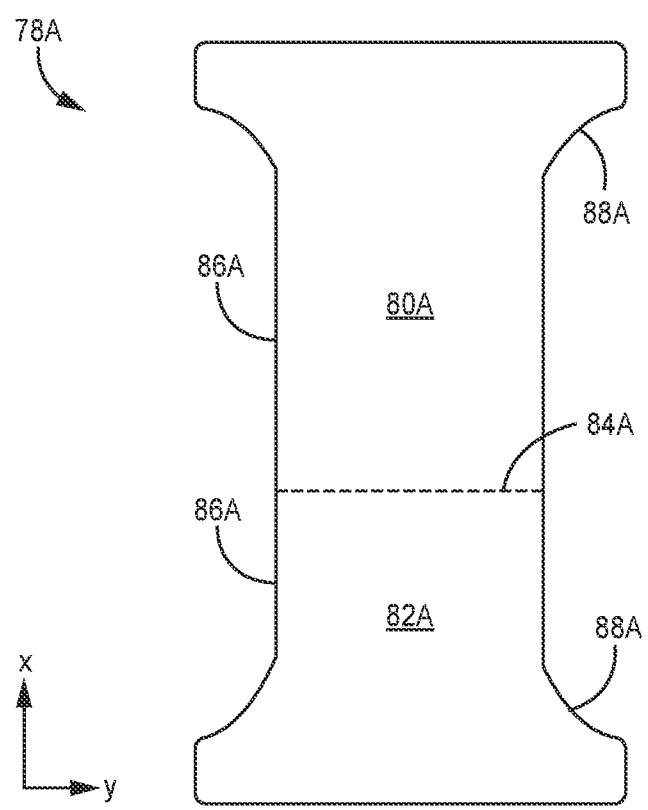
FIGS. 3A and 3B are simplified illustrations of alternative embodiments of a flared mandrel.
Figure 3B:
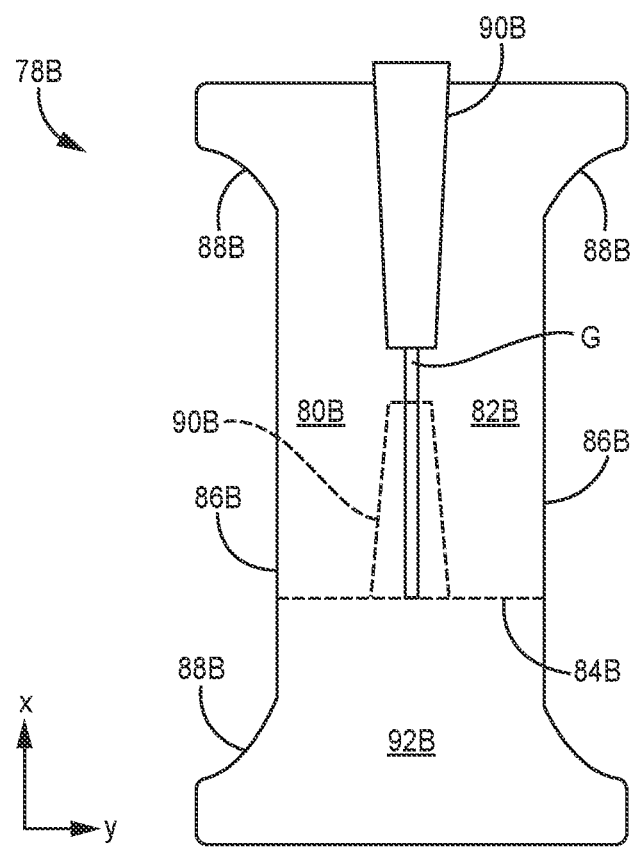

FIGS. 3A and 3B are simplified illustrations of two embodiments of flared mandrels designed to overcome many of the aforementioned challenges. As shown in FIG. 3A, mandrel 78A can be a multi-piece mandrel having first portion 80A and second portion 82A which can be removably secured together at horizontal interface 84A using various connection means, such as tangs, clips, or male/female connectors, including threaded fasteners and pin-slot arrangements. Each portion 80A and 82A can include body region 86A and contoured region 88A. Body region 86A extends primarily along the x-axis, as shown in FIG. 3A, contoured region 88A transitions away from body region 86A toward the y-axis. As oriented in FIG. 3A, contoured region 88A of portion 80A can correspond to the desired contouring between inner cavity 76 and OD platform 66, while contoured region 88A of portion 82A can correspond to the desired contouring between inner cavity 76 and ID platform 64. Although shown schematically as generally uniform, contoured region 88A of portion 80A and contoured region 88A of portion 82A can have different geometries (e.g., height, concavity, etc.) to reflect varied ID and OD airfoil geometry. In an alternative embodiment, mandrel 78A can be a single piece mandrel shaped like either portion 80A or 82A which can be inserted into one end of the braided sleeve at a time for shaping.

As shown in FIG. 3B, mandrel 78B can be a multi-piece wedge mandrel having a longitudinally extending and aligned first portion 80B and second portion 82B. A gap G can form when wedge 90B is driven between first and second portions 80B and 82B after insertion into a braided sleeve, as is discussed in greater detail below. There need not be a gap G, for example, if completely occupied by wedge 90B, which can extend the full length of first and second portions 80B and 82B in some embodiments. First portion 80B and second portion 82B each include a body region 86B extending primarily along the x-axis and contoured region 88B. First portion 80B can be a "leading edge portion" such that its contoured regions 88B corresponds to the desired contouring between inner cavity 76 and OD platform 66 (based on the orientation of FIG. 3B) at leading edge 56 of vane 52 as well as upstream portions of pressure and suction sides 60 and 62, respectively. Second portion 82B can accordingly be a "trailing edge portion" such that its contoured regions 88B correspond to the desired contouring between inner cavity 76 and OD platform 66 at trailing edge 58 of vane 52 as well as downstream portions of pressure and suction sides 60 and 62, respectively. As such, contoured region 88B of portion 80B and contoured region 88B of portion 82B can have different geometries. In an alternative embodiment, first and second portions 80B and 82B can be arranged instead as pressure side and suction side pieces, each extending in the leading edge to trailing edge direction. An optional third portion 92B, similar to portion 82A of mandrel 78A can be used with and/or removably connected to first and second portions 80B and 82B at horizontal interface 84B to form the desired contouring between inner cavity 76 and ID platform 64 (based on the orientation of FIG. 3B), as is discussed in greater detail below. Connection means can be substantially similar to those discussed above with respect to mandrel 78A. Third portion 92B can, in one embodiment, include integral wedge 90B to help more to prevent skewing of portions 80B and 82B.

Mandrels 78A and 78B can be further secured with external tooling, such as lids/caps or cuboid-shaped assembly. With respect to mandrel 78B, wedge 90B can be a distinct piece, as shown, or a projection from a lid/cap in some embodiments. Mandrels 78A and 78B can be formed from or 3D printed/injection molded plastic in an exemplary embodiment, and from metal or graphite in alternative embodiments.

Figure 4:
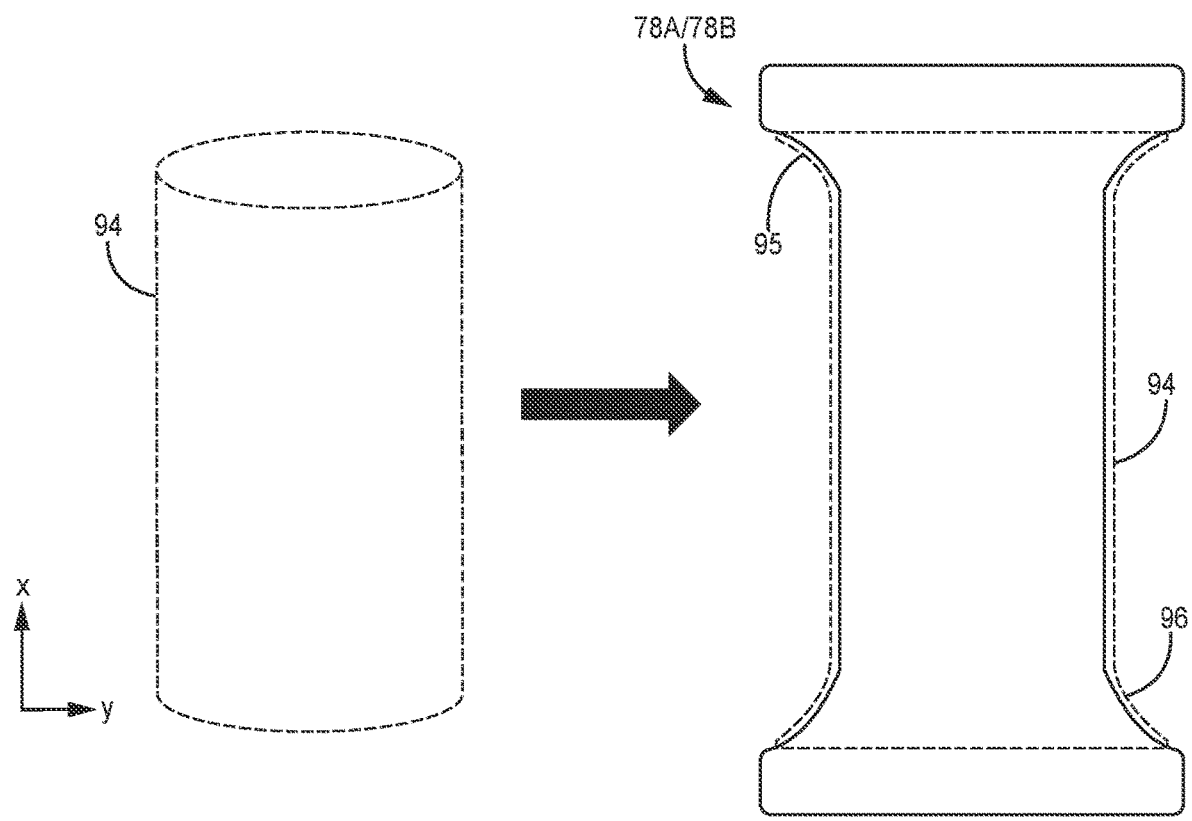
FIG. 4 is a simplified illustration of a braided sleeve before and after shaping with either of the flared mandrels of FIGS. 3A and 3B.
Figure 5:
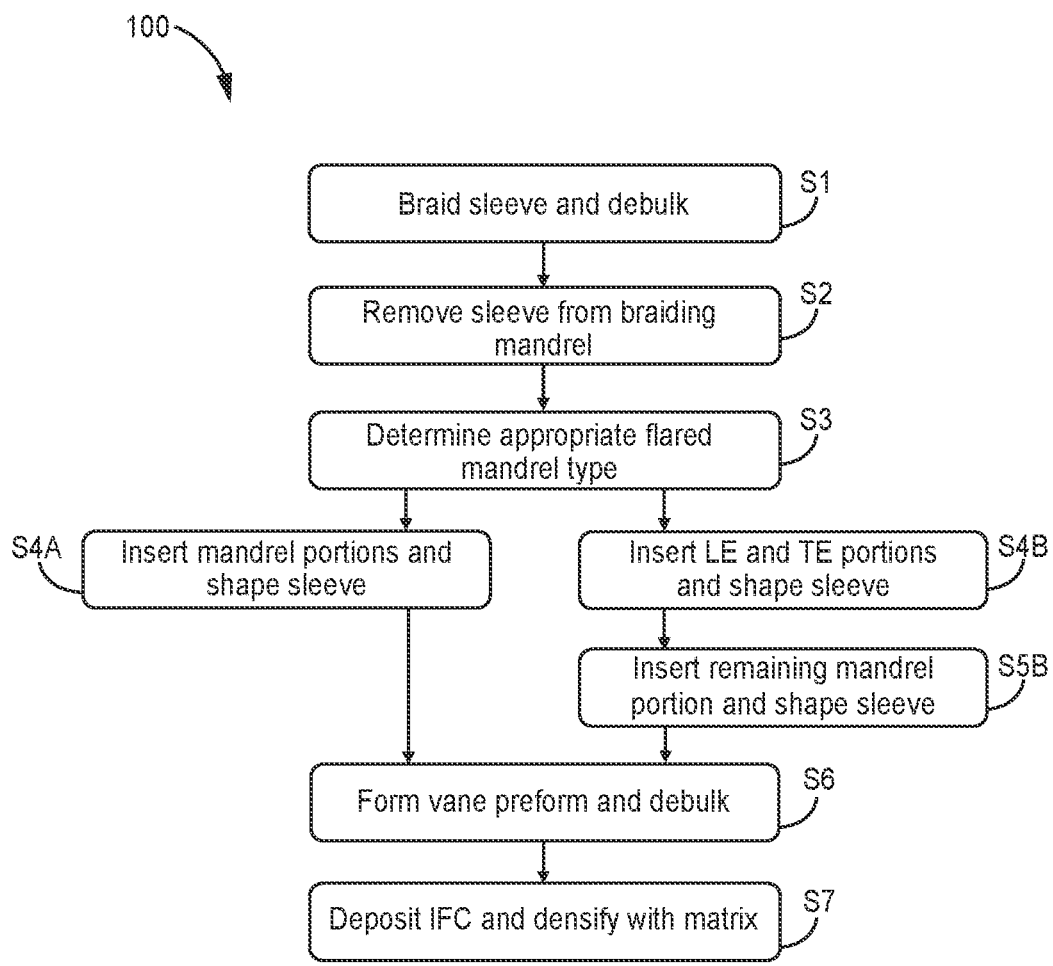
FIG. 5 is a method flowchart illustrating the steps of forming a CMC vane using either of the flared mandrels of FIGS. 3A and 3B.

FIG. 4 is a simplified illustration showing braided sleeve 94 before (left) and after (right) shaping with mandrels 78A or 78B. FIG. 5 is a method flow chart illustrating steps S1-S8 of method 100 for fabricating a vane preform using mandrels 78A and/or 78B. FIGS. 3A-4 are discussed together with method 100.

At step S1, braided sleeve 94 is formed by braiding ceramic fibers around a separate braiding mandrel. Braided sleeve 94 can subsequently be debulked on the braiding mandrel to stabilize the ceramic fibers. At step S2, braided sleeve 94 can be removed from the braiding mandrel. At step S3, either mandrel 78A or mandrel 78B can be selected to shape braided sleeve 94. Mandrel 78A might be preferred for relatively smaller sleeve geometries which may not permit sufficient room for insertion of a wedge (e.g., wedge 90B).

If mandrel 78A is selected, method 100 proceeds to step S4A where mandrel 78A can be inserted into braided sleeve 94 along the longitudinal, or x-axis as shown in FIG. 4. For a multipiece mandrel 78A, first portion 80A can be inserted from one end and second portion 82A from the opposing end. Braided sleeve 94 can be manipulated (e.g., by hand) over contours 88A in mandrel 78A to form corresponding contours 96 in braided sleeve 94. As such, contours 96 formed over first portion 80A and second portion 82A can have different geometries. Localized wetting of the fabric of braided sleeve 94 at this stage can facilitate both mandrel insertion and formation of contours 96.

Returning to step S3, if mandrel 78B is selected, method 100 proceeds to step S4B where mandrel 78B can be inserted into braided sleeve 94, in a portion-by-portion manner. For example, first portion 80B can be inserted into braided sleeve 94 first in the x-direction, then biased/pushed against braided sleeve in the y-direction. The biasing force helps to shape braided sleeve 94 and form a leading edge contour 96. This process can be repeated with second portion 82B to form a trailing edge contour 96. More specifically, second portion 82B can be inserted then pushed in the negative y-direction, that is, away from first portion 80B. Wedge 90B can then be inserted between first and second portions 80B and 82B to increase or at least maintain the bias force along the x-direction. In some cases, gap G will form between first and second portions 80B and 82B with insertion of wedge 90B. Localized wetting of the fabric of braided sleeve 94 at this stage can facilitate both mandrel insertion and formation of contours 96. At step S5B, third portion 92B, if required, can be inserted into braided sleeve 94 to shape the remaining part (i.e., ID end) of braided sleeve 94.

Steps S4A and S5B can each proceed directly to step S6 where any additional ceramic fabric (e.g., platform plies, overwrap airfoil plies, etc.) necessary to form a vane preform can be laid up with contoured braided sleeve 94, and the preform subsequently debulked. In some cases, the additional plies can be laid up with braided sleeve 94 before contouring with mandrels 78A or 78B. At step S7, the IFC can be applied to the vane preform and the preform densified using chemical vapor infiltration (CVI) to form CMC vane 52. In an alternative embodiment, densification can additionally and/or alternatively include other methodologies such as, but not limited to, melt infiltration (MI) and polymer infiltration and pyrolysis (PIP). Mandrels 78A or 78B can be removed so that vane preform can be mounted within CVI specific tooling.

The disclosed mandrels can be used to form contours in CMC components for use in aerospace, maritime, or industrial equipment, to name a few, non-limiting examples.

Discussion of Possible Embodiments

The following are non-exclusive descriptions of possible embodiments of the present invention.

A method of forming a vane preform includes braiding a sleeve from ceramic fibers, inserting a flared mandrel into the sleeve, the flared mandrel comprising a body region and at least one contoured region, manipulating the sleeve using the flared mandrel to form contours in the sleeve corresponding to the contoured region of the flared mandrel, and laying up at least one ceramic ply with the sleeve to form the vane preform.

The method of the preceding paragraph can optionally include, additionally and/or alternatively, any one or more of the following features, configurations and/or additional steps:

The above method can further include after braiding the sleeve but prior to inserting the flared mandrel, debulking the sleeve.

In any of the above methods, the flared mandrel can include a first mandrel portion comprising a first body region and a first contoured region, and a second mandrel portion comprising a second body region and a second contoured region.

In any of the above methods, the step of inserting the flared mandrel can include inserting the first mandrel portion into a first end of the sleeve in a longitudinal direction, and inserting the second mandrel portion into an opposing second end of the sleeve in the longitudinal direction.

In any of the above methods, the step of inserting the flared mandrel can include inserting the first mandrel portion into a first end of the sleeve in a longitudinal direction, and inserting the second mandrel portion into the first end of the sleeve in the longitudinal direction.

In any of the above methods, the step of manipulating the sleeve with the flared mandrel can include pushing the first mandrel portion against the sleeve, and pushing the second mandrel portion against the sleeve and away from the first mandrel portion.

Any of the above methods can further include inserting a wedge between the first mandrel portion and the second mandrel portion.

Any of the above methods can further include inserting a third mandrel portion into a second end of the sleeve in the longitudinal direction.

Any of the above methods can further include wetting the sleeve to facilitate the formation of the contours in the sleeve.

In any of the above methods, the ceramic fibers of the sleeve can be formed from silicon carbide.

A method of forming a vane can include forming a vane preform according to any of the above methods, and densifying the vane preform with a ceramic matrix.

In any of the above methods, the ceramic matrix can include silicon carbide.

A multi-piece flared mandrel suitable for shaping a portion of a vane preform includes a first mandrel portion comprising a first body region and a first contoured region, and a second mandrel portion comprising a second body region and a second contoured region.

The flared mandrel of the preceding paragraph can optionally include, additionally and/or alternatively, any one or more of the following features, configurations and/or additional components:

In the above flared mandrel, the first mandrel portion and the second mandrel portion can be removably attachable at a horizontal interface region.

In any of the above flared mandrels, wherein the first mandrel portion can be longitudinally aligned with the second mandrel portion.

In any of the above flared mandrels, the mandrel can be a wedge mandrel and a wedge can be insertable between the first mandrel portion and the second mandrel portion.

Any of the above flared mandrels can further include a third mandrel portion.

In any of the above flared mandrels, the mandrel can be formed from plastic.

In any of the above flared mandrels, the mandrel can be formed from metal.

In any of the above flared mandrels, the mandrel can be formed from graphite.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of forming a vane preform, the method comprising:
    braiding a sleeve from ceramic fibers;
    inserting a flared mandrel into the sleeve, the flared mandrel comprising a body region and at least one contoured region;
    manipulating the sleeve using the flared mandrel to form contours in the sleeve corresponding to the contoured region of the flared mandrel; and
    laying up at least one ceramic ply with the sleeve to form the vane preform.

2. The method of claim 1 and further comprising: after braiding the sleeve but prior to inserting the flared mandrel, debulking the sleeve.

3. The method of claim 1, wherein the flared mandrel comprises:
    a first mandrel portion comprising a first body region and a first contoured region; and
    a second mandrel portion comprising a second body region and a second contoured region.

4. The method of claim 3, wherein the step of inserting the flared mandrel comprises:
    inserting the first mandrel portion into a first end of the sleeve in a longitudinal direction; and
    inserting the second mandrel portion into an opposing second end of the sleeve in the longitudinal direction.

5. The method of claim 3, wherein the step of inserting the flared mandrel comprises:
    inserting the first mandrel portion into a first end of the sleeve in a longitudinal direction; and
    inserting the second mandrel portion into the first end of the sleeve in the longitudinal direction.

6. The method of claim 5, wherein the step of manipulating the sleeve with the flared mandrel comprises:
    pushing the first mandrel portion against the sleeve; and
    pushing the second mandrel portion against the sleeve and away from the first mandrel portion.

7. The method of claim 6 and further comprising: inserting a wedge between the first mandrel portion and the second mandrel portion.

8. The method of claim 7 and further comprising: inserting a third mandrel portion into a second end of the sleeve in the longitudinal direction.

9. The method of claim 1 and further comprising: wetting the sleeve to facilitate the formation of the contours in the sleeve.

10. The method of claim 1, wherein the ceramic fibers of the sleeve are formed from silicon carbide.

11. A method of forming a CMC vane, the method comprising:
    forming a vane preform according to the method of claim 1; and
    densifying the vane preform with a ceramic matrix.

12. The method of claim 11, wherein the ceramic matrix comprises silicon carbide.

13. A multi-piece flared mandrel suitable for shaping a portion of a vane preform, the flared mandrel comprising:
    a first mandrel portion comprising a first body region and a first contoured region; and
    a second mandrel portion comprising a second body region and a second contoured region,
    wherein the first mandrel portion is longitudinally aligned with the second mandrel portion; and
    wherein the mandrel is a wedge mandrel and a wedge is insertable between the first mandrel portion and the second mandrel portion.

14. The flared mandrel of claim 13, wherein the first mandrel portion and the second mandrel portion are removably attachable at a horizontal interface region.

15. The flared mandrel of claim 13 and further comprising: a third mandrel portion.

16. The flared mandrel of claim 13, wherein the mandrel is formed from plastic.

17. The flared mandrel of claim 13, wherein the mandrel is formed from metal.

18. The flared mandrel of claim 13, wherein the mandrel is formed from graphite.

* * * * *